(12) United States Patent
Wobben

(10) Patent No.: US 7,378,751 B2
(45) Date of Patent: May 27, 2008

(54) FIRE PROTECTION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/681,079

(22) Filed: Mar. 1, 2007

(65) Prior Publication Data

US 2007/0145752 A1 Jun. 28, 2007

Related U.S. Application Data

(62) Division of application No. 10/502,377, filed as application No. PCT/EP03/01224 on Feb. 7, 2003.

(30) Foreign Application Priority Data

Feb. 9, 2002 (DE) ................................ 102 05 373

(51) Int. Cl.
*F03B 13/10* (2006.01)
(52) U.S. Cl. ............................ 290/44; 290/43; 290/54; 290/55
(58) Field of Classification Search .................. 290/44, 290/43, 54, 55, 42
See application file for complete search history.

(56) References Cited

U.S. PATENT DOCUMENTS 5,440,176 A * 8/1995 Haining ........................ 290/54
5,642,984 A * 7/1997 Gorlov ........................ 416/176
5,957,210 A 9/1999 Cohrt et al.
6,012,533 A 1/2000 Cramer
6,531,788 B2 * 3/2003 Robson ........................ 290/43
7,215,036 B1 * 5/2007 Gehring ........................ 290/54

FOREIGN PATENT DOCUMENTS

| DE | 19811851 | 9/1999 |
| DE | 10018181 | 10/2001 |
| DE | 10033650 | 1/2002 |
| EP | 1122425 | 8/2001 |
| EP | 1147789 | 10/2001 |
| EP | 1168479 | 1/2002 |
| JP | 62-367 | 1/1987 |
| WO | 0041769 A1 | 7/2000 |

* cited by examiner

*Primary Examiner*—Darren Schuberg
*Assistant Examiner*—Iraj A. Mohandesi
(74) *Attorney, Agent, or Firm*—Seed IP Law Group PLLC

(57) ABSTRACT

The present invention concerns a wind power installation comprising a pylon and a pod arranged at the tip of the pylon. The invention further concerns a method of controlling such a wind power installation. In order to prevent a fire from occurring or at least to be able to rapidly extinguish a fire which has occurred, there is provided a first apparatus for producing an inert atmosphere.

15 Claims, 3 Drawing Sheets

FIRE PROTECTION

CROSS-REFERENCE TO RELATED APPLICATION

This application is a Divisional of U.S. patent application Ser. No. 10/502,377, filed Apr. 8, 2005, now pending, which application is incorporated herein by reference in its entirety.

BACKGROUND OF THE INVENTION

1. Field of the Invention

The present invention concerns a wind power installation comprising a pylon and a pod arranged at the tip of the pylon. The invention further concerns a method of controlling such a wind power installation. In that respect the term wind power installation in accordance with the invention also includes annex buildings in which for example a transformer or the like is disposed.

The invention further concerns a method of controlling a wind power installation.

2. Description of the Related Art

In horizontal-axis wind power installations, the generator which generates the electrical energy is disposed in the pod. That electrical energy is then passed by way of suitable conductors from the pod at the tip of the pylon to the base of the pylon or an annex building and is fed from there into the energy supply network. Provided for that purpose are further components such as for example rectifiers, switching installations, transformers and so forth, which, depending on the design concept of the wind power installation, are arranged in the pod and/or in the pylon of the wind power installation and/or in the annex building.

Depending on the operational efficiency of the installation, a power of certainly several MWs is to be transmitted. In that respect, once again depending on the design concept of the wind power installation, at least a part of the power— and frequently the entire power—is passed by way of rectifiers, where generally semiconductors are used as switching elements which have to switch considerable currents.

It will be appreciated that it is precisely when high levels of power are involved that high temperatures also inevitably occur, for example in the semiconductors but also in other components of a wind power installation, for example bearings. By virtue of the various causes, those high temperatures can result in the occurrence of a fire in such a wind power installation. A risk of fire also arises if for example, as a consequence of a technical fault, an arc is produced which in turn ignites combustible material in the proximity thereof. Such a fire can then easily result in damage to or destruction of important parts of the wind power installation so that the installation is prevented from continuing to operate. In that respect, in addition to the damage which is caused by the fire, there is then also a loss of output, until the wind power installation is repaired and brought back into operation again.

Since 1999, in accordance with the statutory regulations, wind power installations have already been equipped with fire extinguishing devices in the pod or in the pylon. Those devices are manually operable, which makes the use thereof difficult in an actual fire situation, more specifically if staying in the entire wind power installation should be life-threatening.

DE 100 05 190 discloses a wind power installation with a fire extinguishing arrangement for discharging an extinguishing agent in the pod, there referred to as the receiving space, by which a fire which has broken out is to be extinguished. Suitable devices are provided for that purpose in the pod of the wind power installation. A disadvantage with such a wind power installation however is that considerable amounts of extinguishing agent are already required to extinguish a fire in the pod of that known wind power installation. Considerably more extinguishing agent is required to extinguish a fire in the pylon of the wind power installation. A further disadvantage with that known wind power installation is that damage already occurs when a fire breaks out.

BRIEF SUMMARY OF THE INVENTION

Therefore one object of the present invention is to provide a wind power installation which prevents the occurrence of a fire or at least minimizes the damage.

In a wind power installation of the kind set forth in the opening part of this specification, that object is attained by at least one first apparatus for producing an inert atmosphere in the wind power installation or a part thereof. In that respect the invention is based on the realization that the occurrence of a fire is very substantially prevented in an inert atmosphere and it is therefore possible to forego expensive extinguishing apparatuses.

That object is further attained by a method having the characterizing features recited in claim 13.

In a preferred embodiment of the invention, at least one respective apparatus for producing an inert atmosphere is provided in each of the pylon and the pod of the wind power installation. The relatively large number of apparatuses for producing an inert atmosphere means that an inert atmosphere can be correspondingly more quickly produced in the wind power installation and thus the risk of fire can be correspondingly more quickly eliminated.

In a particularly preferred embodiment of the present invention, an apparatus for producing an inert atmosphere is in the form of a fuel cell. In addition there is provided at least one apparatus for producing hydrogen and for feeding the hydrogen to the fuel cell. As a reaction takes place in fuel cells, in which water is formed from hydrogen and oxygen, the oxygen contained in the air in the interior of the wind power installation can thus be used up. As the atmosphere contains a nitrogen proportion of about 78%, an oxygen proportion of about 21%, and negligible proportions of other gases, the fact that the oxygen is used up in the wind power installation essentially results in a nitrogen atmosphere which is highly inert. Accordingly, in regard to the further considerations herein, the consumption of oxygen and the production of nitrogen can be equated to each other. As soon as the oxygen in the wind power installation is used up, the fuel cells can no longer operate and therefore it also no longer can deliver any electrical energy. That in turn can be used as an indicator that an inert atmosphere has been produced within the wind power installation.

In a particularly preferred development of the invention the electrical energy generated by the fuel cell is fed to the apparatus for producing hydrogen. In that way the amount of electrical energy which is produced by the wind power installation and which has to be used to produce hydrogen is correspondingly reduced.

In a particularly preferred feature the wind power installation according to the invention has a closable drain for water from the wind power installation. In that way the water which is produced in operation of the fuel cell or cells can be removed from the wind power installation. The closability of the drain contributes to preventing fresh air and thus oxygen from re-entering the wind power installation.

In order to permit people to be present in the wind power installation without involving conditions which are made more difficult by virtue of wearing breathing equipment, a preferred development of the invention provides that the wind power installation is provided with closable ventilation openings in the pylon and/or the pod. In that way the installation can be vented quickly before people enter it.

In order to ensure that the installation can only be entered by people when there is a sufficient amount of oxygen available within the installation, there can be provided a multi-stage lock system for access to the wind power installation and an interlinking of the lock system to at least one sensor in the wind power installation. The door of the wind power installation can be unlocked with the lock system only when the sensor has detected a predetermined level of oxygen concentration in the installation.

In a preferred embodiment of the invention the wind power installation includes a storage container with a predetermined capacity for a gas. An inert gas can be collected in that storage container during normal operation of the wind power installation. That inert gas is then ready to be able to immediately flood at least a part of the wind power installation with that gas when required. Therefore, even if all oxygen in the wind power installation has not yet been used up, the (nitrogen) gas can be conveyed immediately into the installation if required during operation of the wind power installation in order immediately to produce a nitrogen atmosphere for example in a part of the installation which is particularly at risk with a fire, and thus reliably to prevent a fire from breaking out.

In a particularly preferred development of the invention the cross-section of the pylon of the wind power installation has at least one floor passing entirely therethrough, the floor having a closable passage opening therethrough. In that way, a part of the wind power installation which is separated off by the floor can already have an inert atmosphere while an oxygen-bearing atmosphere is still present in the other part of the wind power installation. In the case of a fire, that floor can also prevent the spread of soot and smoke and thus limit damage in the installation. In that respect the passage opening can be automatically closable so that for example in the case of an acute fire risk the part of the installation which is endangered by the fire can be separated off and flooded with (nitrogen) gas.

Operating conditions of a wind power installation at which there is an increased risk of fire can already be detected at an early time by one or more sensors for detecting physical parameters such as current, temperature, insulation resistance or conductivity etc. In that way for example the affected part of the wind power installation can be separated off from the rest of the installation by closing the passage openings, and as a precaution flooded with nitrogen. The outbreak of a fire can be prevented in that way. Even if a fire nonetheless breaks out, the damage for example due to soot deposit is limited by the spatial separation effect.

In order to minimize the outage time of the wind power installation after a fault, automatic venting of the wind power installation can be effected as a consequence of predetermined faults. If therefore the nature of the fault already means that service engineers must enter the installation, the time that those service engineers require to travel to the installation can already be used for venting the installation so that, when the service engineers arrive, there is no longer any waiting time that is lost, while waiting for venting to occur. Therefore the work can then be started on the installation immediately.

In addition in a particularly preferred embodiment of the method the lock system can permit access to the installation only when an adequate concentration of oxygen within the installation is detected.

A preferred embodiment of the present invention may include the provision of a display device for displaying the nitrogen/oxygen concentration in the wind power installation. That display device may be mounted clearly visibly at the entrance to the wind power installation.

BRIEF DESCRIPTION OF THE SEVERAL VIEWS OF THE DRAWINGS

Further advantageous embodiments of the invention are set forth in the appendant claims.

An embodiment of the invention is described in greater detail hereinafter with reference to the Figures in which.

DETAILED DESCRIPTION OF THE INVENTION

Figure 1:
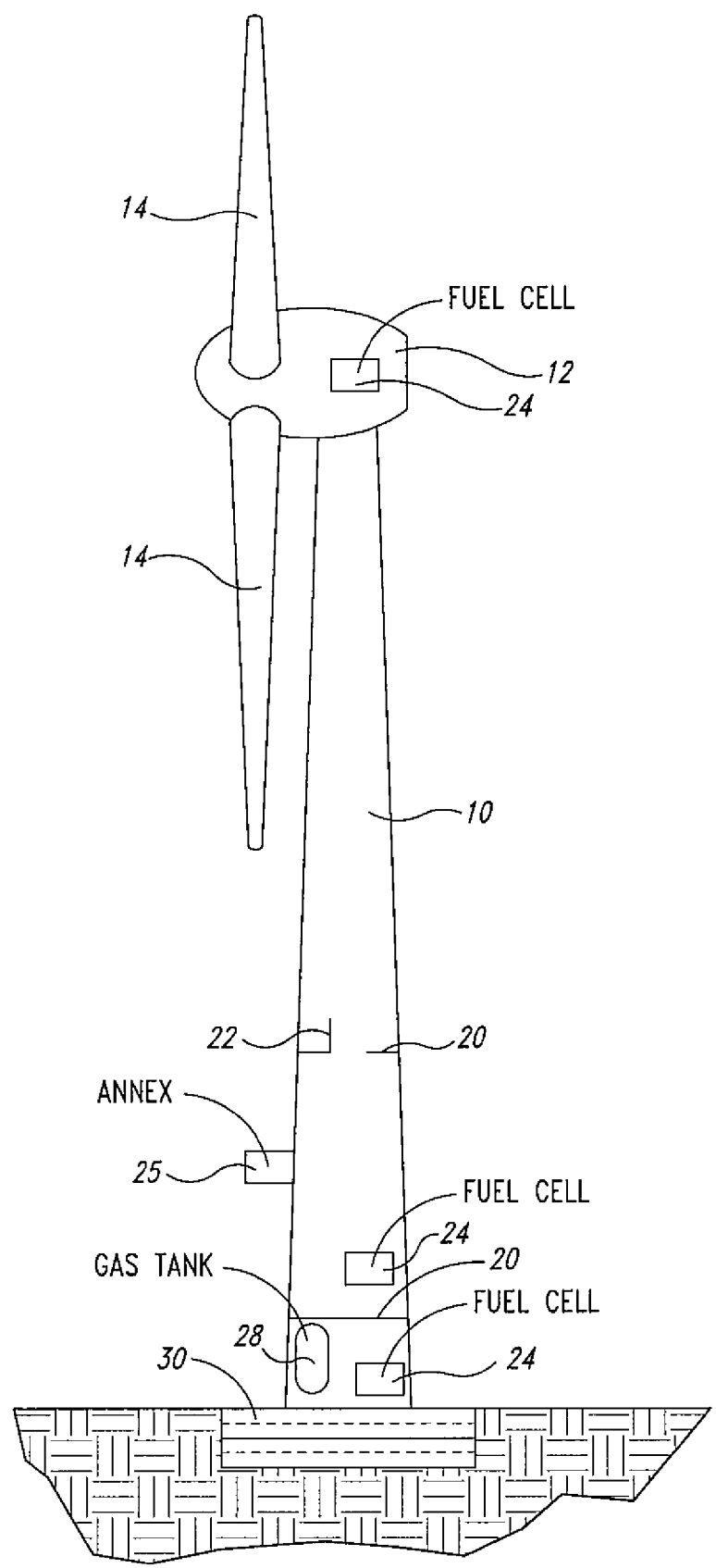
FIG. 1 shows a simplified view of a wind power installation according to the invention.

In FIG. 1 reference 10 denotes the pylon of a wind power installation and reference 12 denotes the pod on which rotor blades 14 are illustrated. The pylon 10 is arranged on a foundation 30 and is divided by intermediate floors 20 into a plurality of portions. In that respect the intermediate floors 20 may have flaps 22, by means of which passage openings can be closed. In that way the pylon 10 can be subdivided into a plurality of portions.

Provided within the pylon 10 and the pod 12 are apparatuses for producing an inert atmosphere as indicated at 24. In a preferred embodiment those apparatuses 24 include fuel cells in order to take oxygen from the air within the wind power installation. When hydrogen is fed to those fuel cells 24 they produce electrical energy as long as oxygen is present in the corresponding portions of the pylon 10.

As the hydrogen is preferably produced by electrolysis, the electrical energy produced by the fuel cells 24 can be used in turn for the electrolysis procedure. In that respect, on the one hand the water which has condensed on the wall of the pylon as a consequence of air humidity with the pylon 10 and which has been collected can be used for the electrolysis procedure. On the other hand, particularly in respect of offshore locations, any amount of hydrogen gas can be obtained from the water of the surrounding sea. The water which occurs during operation of the fuel cell 24 can be collected and discharged in a specifically targeted fashion out of the pylon.

When only hydrogen gas is fed to the fuel cells 24, the oxygen within the portion of the wind power installation in which the respective fuel cell 24 is arranged is used up by operation of that fuel cell 24. In other words, the fuel cell 24 will generate electrical energy as long as oxygen is available within the portion of the pylon in which the fuel cell is disposed. As soon as the oxygen is used up, the fuel cell 24 will cease to generate electrical energy. That therefore affords a particularly simple possible way of establishing whether oxygen is still present in the air within the portion of the wind power installation which has the fuel cell 24.

In order to feed as far as possible all oxygen in the pylon to the fuel cells, it is advantageous to provide a ventilation means or other means for thoroughly mixing all the air in the wind power installation so it is not just the oxygen in the air around the fuel cell that is consumed, but all oxygen disposed in the whole of the wind power installation.

A portion for example of the pylon 10 of the wind power installation can be separated by an intermediate floor 20 with a passage opening which is closable by a flap 22, so that the fuel cell 24 in that portion only has to remove the oxygen from a reduced volume in that separated-off portion of the pylon, in order to produce an inert atmosphere there. By virtue of the normal composition of the ambient air consisting of about 21% oxygen, 78% nitrogen and small proportions of other gases, the inert atmosphere, after the oxygen has been consumed, is substantially a nitrogen atmosphere.

In addition, provided in a portion of the pylon 10 is a storage container 28. A fuel cell 24 is also arranged in the same portion of the pylon. A nitrogen atmosphere is also produced in that portion, by virtue of operation of the fuel cell 24. As soon as the oxygen is consumed, that nitrogen can then be pumped into the storage container 28. That portion of the pylon is then ventilated again with ambient air and the procedure is repeated so that a stock of nitrogen can be collected in the storage container 28 (gas tank).

It will be appreciated that, in place of a portion of the pylon, it is also possible to provide a space 25 which is separated off, outside the pylon 10 of the wind power installation, for example in the form of a container or an annex building. The first apparatus 24 for producing an inert atmosphere can be contained in that container. In that way, none of the portions of the pylon has to be repeatedly ventilated so that the risk of unintentionally ventilating other portions of the pylon is avoided. If it is necessary, a given part of the wind power installation, such as for example a portion of the pylon 10 or the pod 12, can be very rapidly flooded with nitrogen by way of suitable conduits and pumps, by the nitrogen being pumped there from the storage container 28. In that way a nitrogen atmosphere can be produced immediately in certain regions when required without having to wait until the fuel cell 24 has consumed the oxygen.

Figure 2:
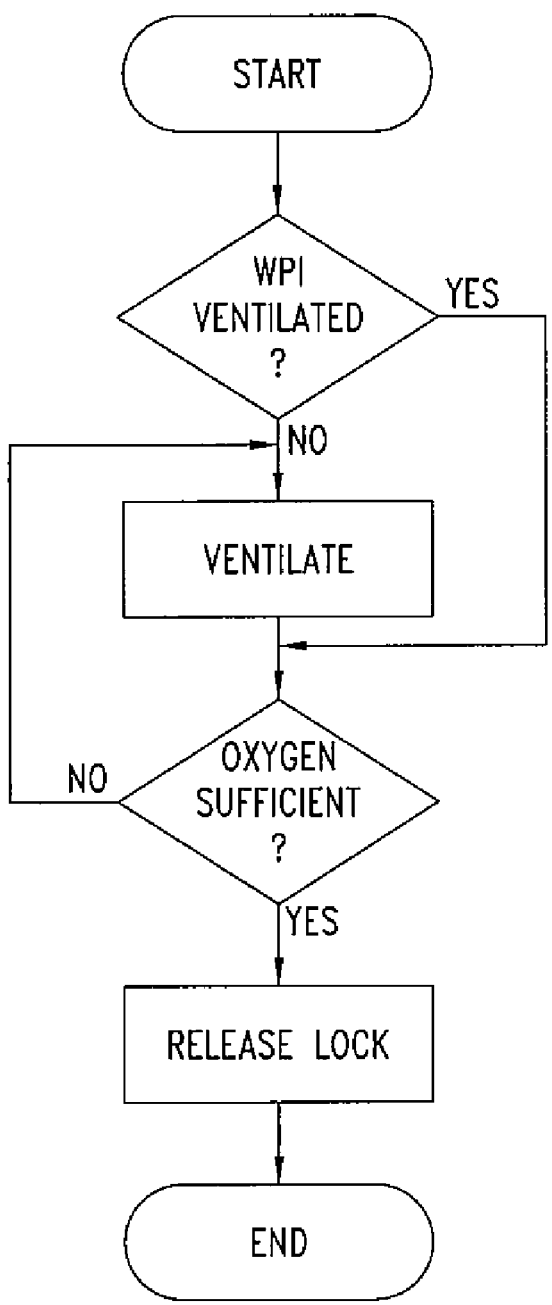
FIG. 2 shows a simplified view of the method when opening the access to the wind power installation.

FIG. 2 shows a flow chart representing the progress of the control method when opening the wind power installation, for example to permit access for the service personnel. It will be assumed that the initial situation is normal operation of the wind power installation, in which, by virtue of sufficiently long periods of operation of the fuel cells (reference 24 in FIG. 1), an inert nitrogen atmosphere has been produced within the wind power installation or after a part of the wind power installation has been flooded with nitrogen. If the installation is stopped for example due to a fault and if the nature of the fault is already such that the service personnel must enter the installation, the stopped installation can already be ventilated, prior to the entry of the service personnel, for example by means of closable ventilation flaps in the door and the pod. The service personnel can therefore immediately enter the installation when they arrive, and begin with the repair procedure.

In order however to be sure of preventing people from entering a wind power installation in which an inert atmosphere prevails, there can be provided a lock system which enables access to the installation only when a sufficient oxygen concentration is detected in the interior of the installation. Therefore, at the first query in FIG. 2, a check is made to ascertain whether the wind power installation is already vented. If that is not the case the installation is firstly vented and then it is detected whether there is an adequate oxygen concentration within the installation.

If the wind power installation has already been vented, a check is immediately made to ascertain whether there is an adequate oxygen concentration. If that is not the case the installation continues to be vented. When there is an adequate oxygen concentration, the lock is released so that the access to the wind power installation can be unlocked and access is then possible. Preferably the oxygen/nitrogen concentration should be checked not just at a single location, for example in the pod, but at a plurality of locations between the pod and the base of the pylon. With nitrogen in the air it is necessary at any event to ensure that a person in the lower part of the pylon does not climb up and there suffocate due to a lack of oxygen. The fans (not shown) which are usually provided in the wind power installation must also be used to provide for fresh air for a rapid and equally distributed atmosphere of air with an adequate oxygen content (21%), right at the beginning of the ventilation procedure.

Figure 3:
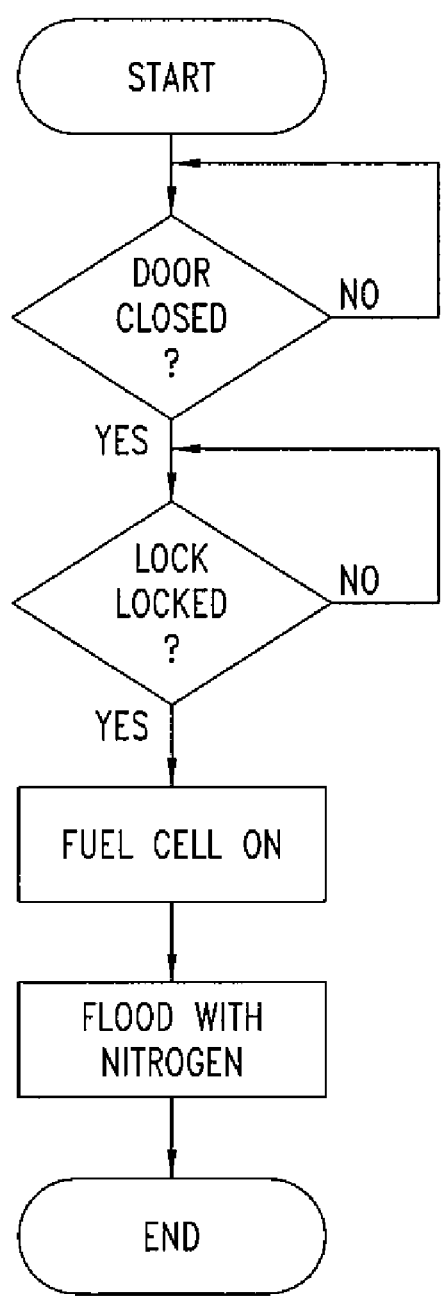
FIG. 3 shows a simplified view of the method when closing the wind power installation.

FIG. 3 diagrammatically shows the procedure when closing the installation, for example after concluding the work and bringing the installation back into operation again. Firstly, a check is made to ascertain whether the access opening such as for example a door is closed. As long as the door is not closed, any access to the installation is possible and thus the creation of an inert atmosphere is already prevented for that reason. In addition, oxygen always continues to flow through the open door so that it is already impossible to produce an inert atmosphere for that reason.

As soon as the door is closed, a check is made to ascertain whether the lock has been actuated, that is to say whether the door is locked fast. This ensures that the installation cannot be accidentally entered or that the control means, on the basis of the closing procedure required before entering the installation, can detect that someone is trying to enter the wind power installation and can thus initiate ventilation of the installation in good time.

When therefore the door is closed and the lock locked, the control means can set the fuel cells in operation and thus begin to produce an inert atmosphere (nitrogen atmosphere) within the wind power installation.

As it is precisely after the execution of repair operations that the risk of a fire is particularly severe, for example as a consequence of assembly errors or technical faults on the spare parts, and as the oxygen concentration within the wind power installation is still high in the time shortly after the service personnel have left the installation, a certain part of the wind power installation, for example a part thereof which is equipped with switching equipment, can be flooded with nitrogen from a storage means. In that way the risk of fire is immediately considerably reduced. The fact that, when the entire wind power installation is flooded with nitrogen and the inert atmosphere produced therewith within the wind power installation, the normal fire extinguishing service personnel cannot enter the installation, is acceptable because in any case, in the event of a fire within a wind power installation, the extinguishing service personnel can scarcely pass into the interior thereof without themselves suffering injury.

It will be appreciated that further technical measures are possible, which prevent a person from being mistakenly locked inside a wind power installation and thus exposed to a nitrogen atmosphere. That can be implemented for example by motion sensors such as infrared sensors. An additional or alternative measure can be expressly signing-in and signing-out of any person who enters the wind power installation and leaves it again. In addition, it is also possible to envisage providing that the fuel cells or pumps with which a certain portion of the wind power installation is flooded with nitrogen are switched on with a time delay so that, even after a person is by mistake locked inside the wind power installation, there is still a certain period of time available to notice the mistake and to free the person from the installation in good time. Finally the access to the installation from the interior can be provided with an emergency opening device which makes it possible to leave the installation even without a key.

Supplying the interior of the wind power installation with an inert atmosphere such as a nitrogen gas is not just limited to the pod or to the interior of the pylon. As the pod is also directly connected to the rotor and thus the rotor blades of the wind power installation, the rotor blades can also be supplied in the interior with a suitable nitrogen atmosphere in order also to prevent a fire from breaking out in the rotor blades. In addition, one skilled in the art can appreciate that a fire protection system as described herein may also be utilized in any enclosure within which people are not present in large numbers, such as in aircraft wings and empennage or in watercraft and ship containers and compartments. It can also be appreciated that even in enclosures within which people are present in higher numbers, such as buildings, factories, and aircraft fuselage, an embodiment of the present invention may interact with the enclosure alarm system such that it activates after a predetermined amount of time from when the alarm is set off to allow for either the vacation of occupants from the enclosure or the provision of oxygen delivery device to the occupants.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising a pylon and a pod arranged at the tip of the pylon, and having at least one apparatus for producing an inert atmosphere in the wind power installation and closable ventilation openings in the wind power installation a first apparatus for producing an inert atmosphere is in a first space of the wind power installation and a second apparatus for producing an inert atmosphere is in a second space of the wind power installation.

2. The wind power installation according to claim 1 wherein the first space is in the interior of the pylon and the second space is in the interior of the pod.

3. The wind power installation according to claim 1 wherein the first space is in the interior of the pylon and the second space is in the interior of a rotor blade.

4. The wind power installation according to claim 1 wherein the first space is in the interior of an annex building and the second space is in the interior of the pod.

5. The wind power installation according to claim 1 wherein the first space is in one of the group of the pod, the pylon or an annex building and the second space is in one of a rotor blade, the pod or the pylon, the second space being different from the first space.

6. The wind power installation according to claim 1 wherein the apparatus for producing an inert atmosphere includes a fuel cell and there is an electrical connection between the fuel cell and an apparatus for producing hydrogen.

7. The wind power installation according to claim 1 wherein the apparatus for producing an inert atmosphere comprises a storage tank containing the inert gas which is releasable into the wind power installation to create the inert atmosphere.

8. The wind power installation according to claim 1 further including a closable drain for water from the wind power installation.

9. The wind power installation according to claim 1 wherein the wind power installation includes an annex building as part of the wind power installation.

10. The wind power installation according to claim 1 characterized by a multi-stage lock system in the access to the wind power installation and an interlinking of the lock system to at least one sensor within the wind power installation.

11. The wind power installation according to claim 1 further including a storage container of predetermined capacity for an inert gas.

12. The wind power installation according to claim 11 wherein the apparatus for producing an inert atmosphere is associated with the storage container and the apparatus is in a predetermined space volume, and having a connection between the space volume and the storage container, through which the inert gas of the space volume is transported into the storage container.

13. The wind power installation according to claim 1 further including at least one floor which passes through the cross-section of the pylon and has a closable passage opening.

14. A wind power installation according to claim 1 further including a lock system which is actuable in dependence on a release signal.

15. The wind power installation according to claim 1 further including at least one sensor for detecting physical parameters including oxygen content in the air.

* * * * *